(12) United States Patent
Bishop

(10) Patent No.: US 6,616,212 B1
(45) Date of Patent: Sep. 9, 2003

(54) TRUCK BED TARP SUPPORT ASSEMBLY

(76) Inventor: Richard L. Bishop, 1848 Plank Rd. P.O. Box 176, Carrolltown, PA (US) 15722

( * ) Notice: Subject to any disclaimer, the term of this patent is extended or adjusted under 35 U.S.C. 154(b) by 0 days.

(21) Appl. No.: 10/259,976

(22) Filed: Sep. 27, 2002

(51) Int. Cl.[7] .......................... E04H 15/06; E04H 15/34; B60P 7/04
(52) U.S. Cl. .................. 296/100.18; 296/159; 296/161; 135/88.15; 135/909; 135/158
(58) Field of Search ...................... 296/100.18, 159, 296/161, 26.04, 100.12; 135/88.13, 88.15, 88.16, 909, 901, 900, 158

(56) References Cited

U.S. PATENT DOCUMENTS

| | | | |
|---|---|---|---|
| 2,840,400 A | * | 6/1958 | D'Azzo |
| 3,009,212 A | * | 11/1961 | Makens |
| 4,263,925 A | | 4/1981 | Arganbright |
| 4,310,194 A | * | 1/1982 | Biller ........................ 296/159 |
| 4,332,265 A | * | 6/1982 | Baker |
| RE31,465 E | * | 12/1983 | Robichaud ................... 135/88 |
| 4,465,316 A | * | 8/1984 | Roisen ......................... 135/88 |
| 4,716,919 A | * | 1/1988 | Griffin ........................ 135/901 |
| D310,503 S | | 9/1990 | Moore |
| 5,054,841 A | * | 10/1991 | Zalman ...................... 296/100 |
| 5,056,855 A | | 10/1991 | Moravsky |
| 5,299,849 A | | 4/1994 | Cook et al. |
| 5,335,685 A | * | 8/1994 | Dahulich ..................... 135/909 |
| 5,341,588 A | * | 8/1994 | Lizotte ........................ 135/901 |
| 5,353,826 A | | 10/1994 | Davis, Sr. |
| 5,641,192 A | * | 6/1997 | Smith et al. ............. 135/88.13 |
| D382,247 S | | 8/1997 | Lindberg |
| 5,660,002 A | * | 8/1997 | Lashinger ................... 135/909 |

FOREIGN PATENT DOCUMENTS

GB 2164971 * 4/1986 ................. 135/901

* cited by examiner

*Primary Examiner*—D. Glenn Dayoan
*Assistant Examiner*—H. Gutman

(57) ABSTRACT

A truck bed tarp support assembly for quick assembly to be positioned in a bed of a pickup truck to facilitate providing shelter over the pickup truck bed includes a plurality of tubes interconnected to from a support frame having a base that rests on the bottom of a pickup truck bed. A base portion of the support frame further has a pair of raised portions positioned to receive wheel wells in the pickup truck bed.

7 Claims, 3 Drawing Sheets

TRUCK BED TARP SUPPORT ASSEMBLY

BACKGROUND OF THE INVENTION

1. Field of the Invention

The present invention relates to tarp supports and more particularly pertains to a new truck bed tarp support assembly for quick assembly to be positioned in a bed of a pickup truck to facilitate providing shelter over the pickup truck bed.

2. Description of the Prior Art

The use of tarp supports is known in the prior art. U.S. Pat. No. 5,299,849 describes a cover assembly that attaches to the tops of the sidewalls of a pickup truck bed. Another type of vehicle cover support assembly is U.S. Pat. No. 5,056,855 also showing an assembly attached to the top of the sidewalls of a pickup truck bed. U.S. Pat. Nos. 5,353,826 and 4,263,925 each also show a cover support assembly attached to the top of the sidewalls of a pickup truck bed. U.S. Pat. No. Des. 382,247 and U.S. Pat. No. Des. 310,503 each show an ornamental appearance for a tent frame for covering a pickup truck bed.

While these devices fulfill their respective, particular objectives and requirements, the need remains for an assembly that is very easily assembled and disassembled yet does not attach to the tops of the sidewalls of a pickup truck bed.

SUMMARY OF THE INVENTION

The present invention meets the needs presented above by providing an easily assembled plurality of tubes that form a support assembly having a base portion that rests on the bottom of a pickup truck bed.

Still yet another object of the present invention is to provide a new truck bed tarp support assembly that utilizes wheel wells in a pickup truck bed to prevent lateral movement of the support frame.

Even still another object of the present invention is to provide a new truck bed tarp support assembly that provides an easy lightweight frame to support a tarp over a pickup truck bed.

To this end, the present invention generally comprises a plurality of tubes interconnectable to from a support frame having a base that rests on the bottom of a pickup truck bed. A base portion of the support frame further has a pair of raised portions positioned to receive wheel wells in the pickup truck bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
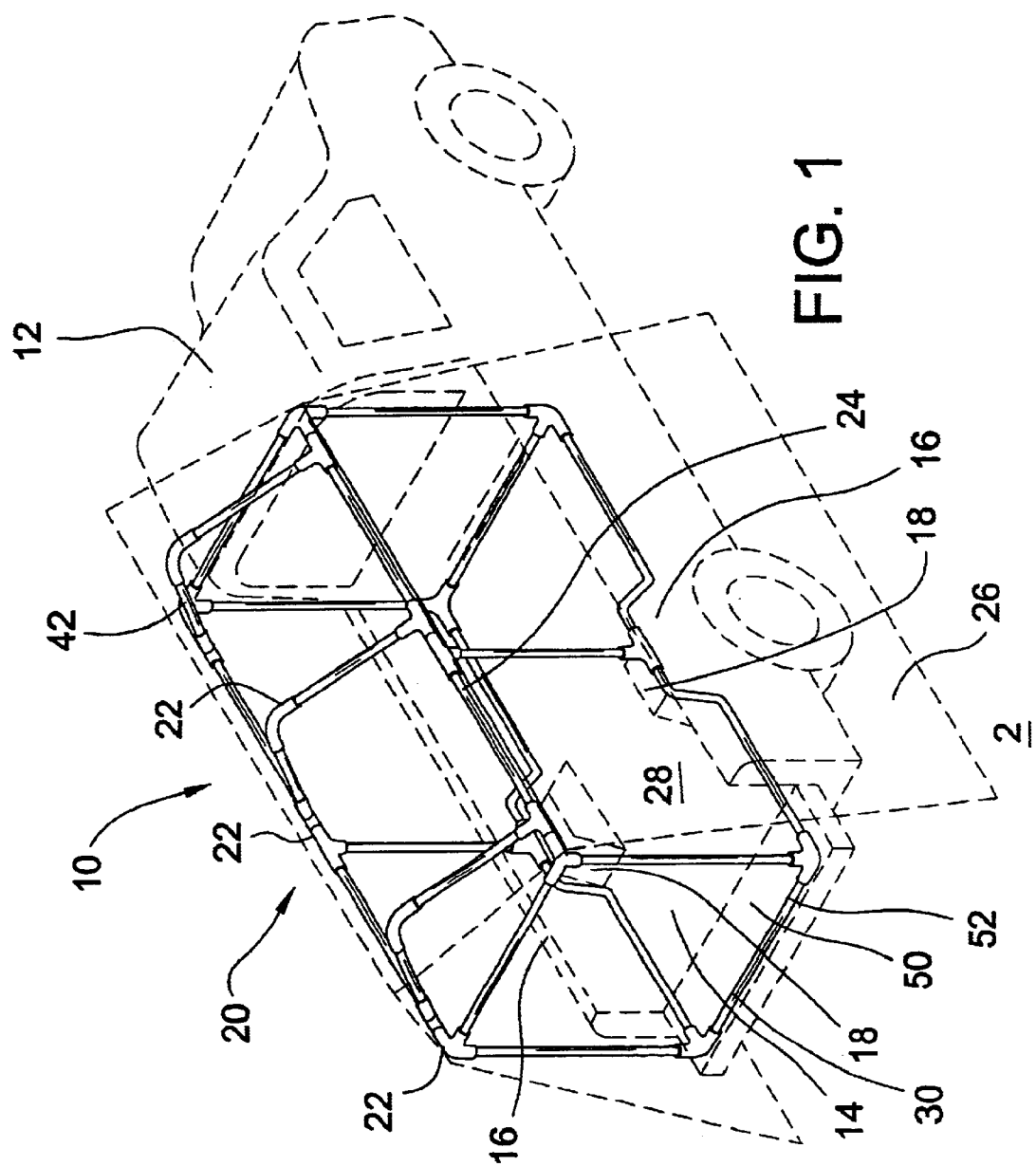
FIG. 1 is a perspective view of a new truck bed tarp support system according to the present invention.
Figure 2:
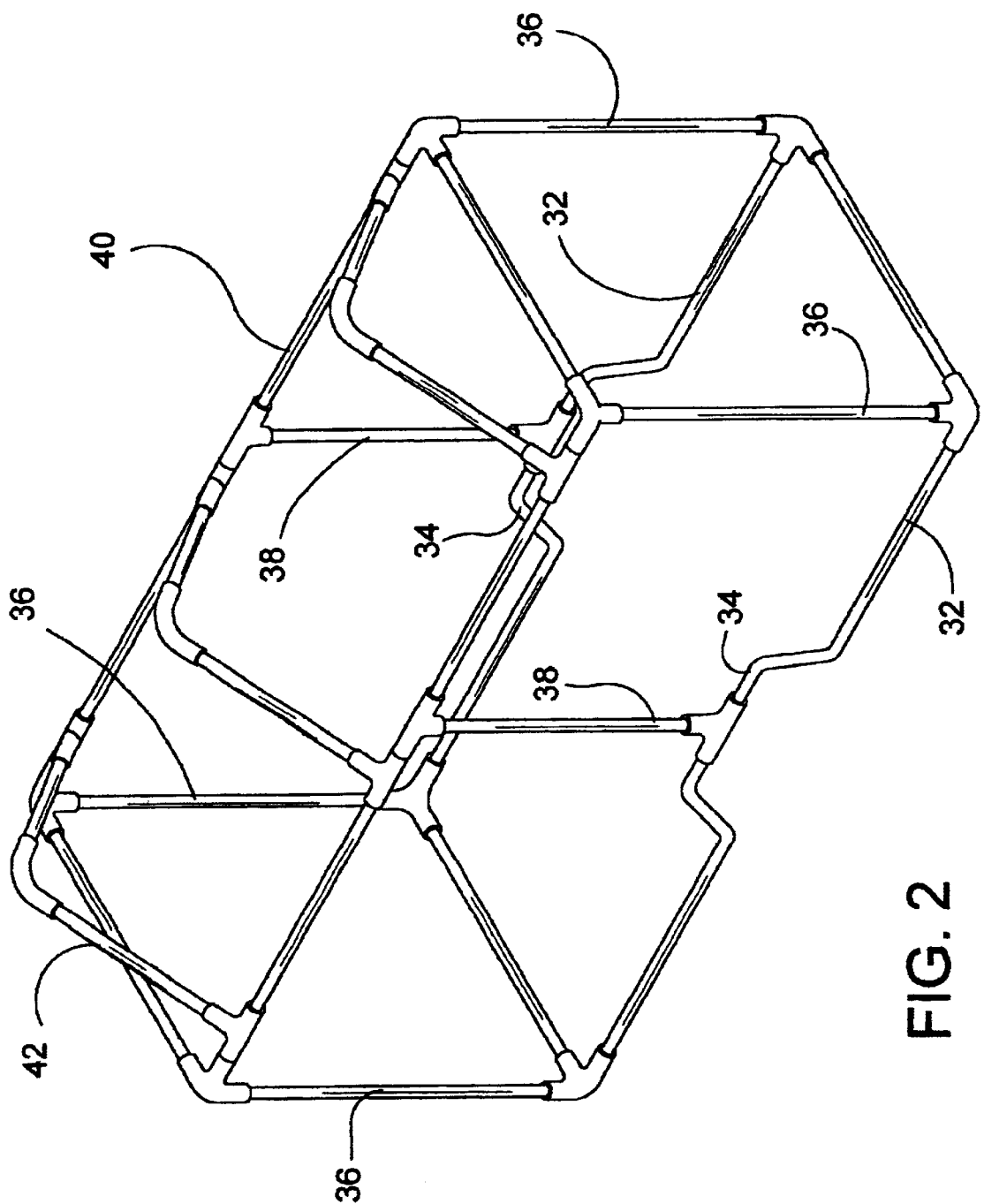
FIG. 2 is a perspective view of the support frame of the present invention.
Figure 3:
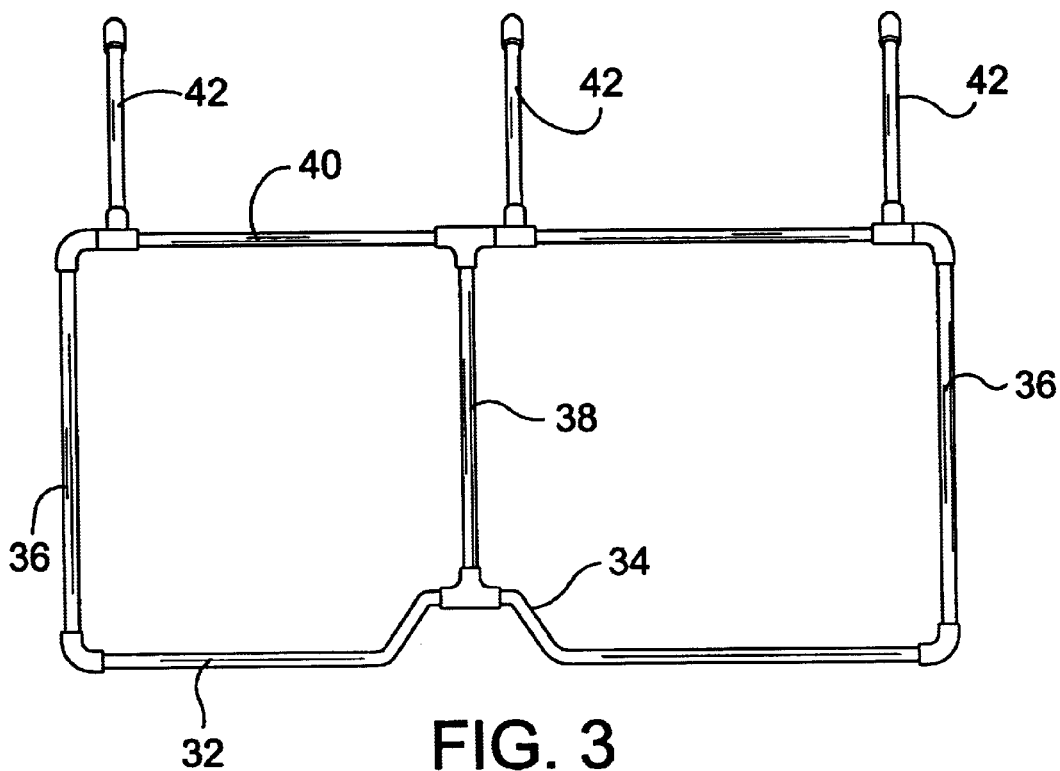
FIG. 3 is a side view of the present invention.
Figure 4:
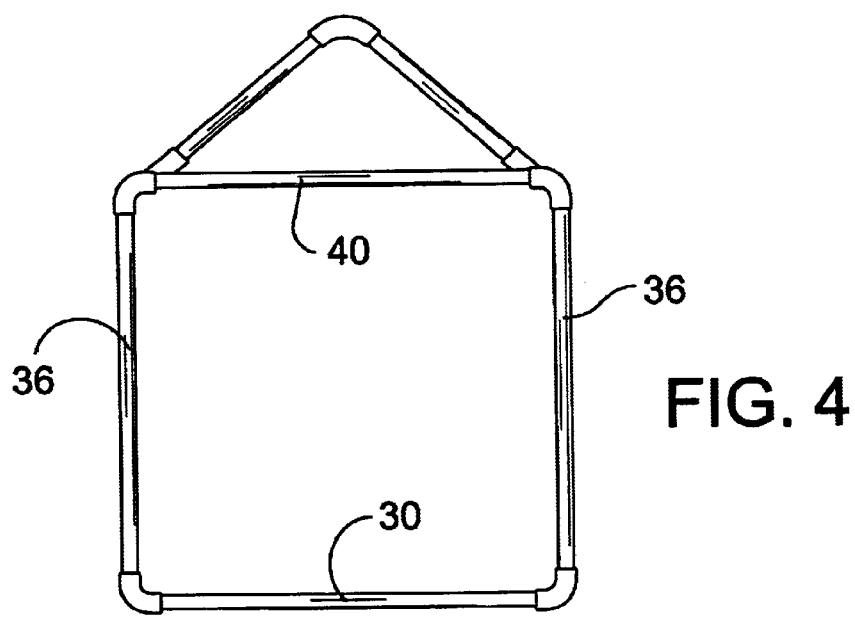
FIG. 4 is an end view of the present invention.

With reference now to the drawings, and in particular to FIGS. 1 through 4 thereof, a new truck bed tarp support assembly embodying the principles and concepts of the present invention and generally designated by the reference numeral 10 will be described.

As best illustrated in FIGS. 1 through 4, the truck bed tarp support assembly 10 generally comprises a pickup truck 12 having a pickup truck bed 14. A plurality of tubular members 20 are interconnected using joint members 22 to form a support frame 24. A tarp 26 is positioned over the support frame 24 and extends over the pickup truck bed 14 such that the tarp 26 is designed for being anchored to a ground surface 2.

The support frame 24 includes a base portion 30 resting on a bottom 28 of the pickup truck bed 14. The base portion 30 of the support frame 24 is generally rectangular such that side portions 32 of the base portion 30 are positioned substantially adjacent to sidewalls 16 of the pickup truck bed 14 for preventing lateral movement of the support frame 24 in the pickup truck bed 14.

The side portions 32 of the base portion 30 of the support frame 24 include a pair of raised portions 34. Each raised portion 34 receives a respective wheel well 18 of the pickup truck 12 for holding the support frame 24 in a static position in the pickup truck bed 14.

The support frame 24 includes four generally vertical corner members 36 extending upwardly from corners of the base portion 30, two generally vertical side support members 38 each extending upwardly from a medial portion of the side portions 32 of the base portion 30, and a generally rectangular top portion 40. The support frame 24 further includes a plurality of aligned angled cross portions 42 extending upwardly from the top portion 40 to form a peak for supporting the tarp 26 such that precipitation falling on the tarp 26 while the tarp 26 is supported by the support frame 24 is directed off of the tarp 26.

In an embodiment, the side support members 38 extend upwardly from the raised portions 34 of the base portion 30.

The support frame is sized to correspond to the size of the pickup truck bed but for pickup trucks that include a fold down tailgate 50, the side portions 32 of the base portion have a length such that an end 52 of the base portion 30 is positioned on the tailgate 50 when the tailgate 50 is in an open position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A truck bed tarp support assembly for positioning in a pickup truck bed of a pickup truck to support a tarp over the pickup truck bed, said truck bed tarp support assembly comprising:

a plurality of tubular members, said tubular members being interconnected to form a support frame;

said support frame having a base portion adapted for resting on a bottom of the pickup truck bed;

said base portion of said support frame including a pair of raised portion, each one of said pair of said raised portions being adapted for receiving a respective wheel well of the pickup truck for holding said support frame in a static position in the pickup truck bed.

2. The truck bed tarp support assembly of claim 1, further comprising:

said base portion of said support frame being generally rectangular.

3. The truck bed tarp support assembly of claim 1 wherein said support frame includes a plurality of aligned angled cross portions forming a peak for supporting the tarp such that precipitation falling on the tarp while the tarp is supported by said support frame is directed off of the tarp.

4. The truck bed tarp support assembly of claim 1 wherein said base portion is generally rectangular, four generally vertical corner members extending upwardly from corners of said base portion, two generally vertical side support members each extending upwardly from a medial portion of a respective lengthwise side of said base portion, and a generally rectangular top portion.

5. The truck bed tarp support assembly of claim 4 wherein said support frame further includes a plurality of aligned angled cross portions extending upwardly from said top portion to form a peak for supporting the tarp such that precipitation falling on the tarp while the tarp is supported by said support frame is directed off of the tarp.

6. A truck bed tarp support system comprising:

a pickup truck having a pickup truck bed;

a plurality of tubular members, said tubular members being interconnected to form a support frame;

a tarp positioned over said support frame, said tarp extending over the pickup truck bed such that said tarp is adapted for being anchored to a ground surface;

said support frame having a base portion resting on a bottom of said pickup truck bed;

said base portion of said support frame being generally rectangular such that side portions of said base portion are positioned substantially adjacent to sidewalls of said pickup truck bed for preventing lateral movement of said support frame in said pickup truck bed;

said side portions of said base portion of said support frame including a pair of raised portions, each one of said pair of said raised portions receiving a respective wheel well of said pickup truck for holding said support frame in a static position in the pickup truck bed;

wherein said support frame includes four generally vertical corner members extending upwardly from corners of said base portion, two generally vertical side support members each extending upwardly from a medial portion of said side portions of said base portion, and a generally rectangular top portion;

wherein said support frame further includes a plurality of aligned angled cross portions extending upwardly from said top portion to form a peak for supporting said tarp such that precipitation falling on said tarp while said tarp is supported by said support frame is directed off of said tarp; and wherein said side support members extend upwardly from said raised portions of said base portion.

7. The truck bed tarp support system of claim 6 further comprising:

said pickup truck having a fold down tailgate;

said side portions of said base portion having a length such that an end of said base portion is positioned on said tailgate when said tailgate is in an open position.

* * * * *